United States Patent [19]
Hino et al.

[11] Patent Number: 5,302,666
[45] Date of Patent: Apr. 12, 1994

[54] BISPHENOL A AND NOVOLAK EPOXY RESINS WITH NITRILE RUBBER

[75] Inventors: Seiichi Hino, Yokohama; Jun Enda, Machida; Masaki Yamamoto, Yokohama, all of Japan

[73] Assignee: Mitsubishi Kasei Corporation, Tokyo, Japan

[21] Appl. No.: 637,624

[22] Filed: Jan. 4, 1991

[30] Foreign Application Priority Data

Jan. 8, 1990 [JP] Japan .................................. 2-1174

[51] Int. Cl.$^5$ .................... C08L 63/02; C08L 63/04
[52] U.S. Cl. .................... 525/113; 525/109; 525/114; 525/119; 525/122; 525/485; 525/486; 525/488; 525/489
[58] Field of Search ............... 525/109, 113, 114, 485, 525/486, 488, 489, 524, 119, 122

[56] References Cited

U.S. PATENT DOCUMENTS

| | | | |
|---|---|---|---|
| 3,707,583 | 6/1971 | McKown | 525/524 |
| 3,894,113 | 7/1975 | Pagel | 525/113 |
| 3,948,849 | 4/1976 | Barie, Jr. | 525/114 |
| 4,040,993 | 8/1977 | Elbling et al. | 525/524 |
| 4,342,852 | 8/1982 | Takeda et al. | 525/481 |
| 4,500,660 | 2/1985 | Minamisawa et al. | 523/428 |
| 4,798,761 | 1/1989 | Wykowski et al. | 525/113 |
| 5,143,950 | 9/1992 | Kitagawa et al. | 525/524 |

FOREIGN PATENT DOCUMENTS

| | | | |
|---|---|---|---|
| 2525617 | 10/1983 | France | |
| 63-40517 | 2/1988 | Japan | |
| 63-170228 | 2/1988 | Japan | |
| 63-308026 | 12/1988 | Japan | 525/524 |
| 1-185351 | 7/1989 | Japan | |

OTHER PUBLICATIONS

Lee and Neville, *Handbook of Epoxy Resins,* McGraw-Hill Book Co., New York, N.Y., 1967, pp. 4–60.

Patent Abstracts of Japan, vol. 14, No. 149 (C-705) [4092], Mar. 22, 1990, & JP-A-2-020546, Jan. 24, 1990, S. Hino, et al., "Resin Composition for Fiber-Reinforced Plastics".

Patent Abstracts of Japan, vol. 13, No. 529 (C-658) [3877], Nov. 27, 1989, & JP-A-1-215850, Aug. 29, 1989, S. Hino, et al., "Resin Composition for Fiber-Reinforced Plastic".

Patent Abstracts of Japan, vol. 10, No. 203 (C-360) [2259], Jul. 16, 1986, & JP-A-61-43615, Mar. 3, 1986, K. Tominaga, "Epoxy Resin Composition".

*Primary Examiner*—Robert E. Sellers
*Attorney, Agent, or Firm*—Oblon, Spivak, McClelland, Maier & Neustadt

[57] ABSTRACT

A resin composition for fiber reinforced plastic comprising the following components A, B, C, D and E as essential components:

A: a bisphenol A epoxy resin having an epoxy equivalent of at most 250 and being liquid at room temperature, B: a bisphenol A epoxy resin having an epoxy equivalent within a range of from 400 to 5,000 and softening point of from 60° to 200° C., C: a phenol novolak type epoxy resin, D: a nitrile rubber, and E: a curing agent.

8 Claims, No Drawings

BISPHENOL A AND NOVOLAK EPOXY RESINS WITH NITRILE RUBBER

BACKGROUND OF THE INVENTION

1. Field of the Invention

The present invention relates to a resin composition for fiber reinforced plastic. More particularly, it relates to a resin composition suitable for fiber reinforced plastic materials wherein fibers of high elasticity are employed.

2. Discussion of Background

It is well known to impregnate an epoxy resin or an unsaturated polyester resin to a reinforcing material such as carbon fibers or glass fibers, followed by curing to form molded products having various shapes and thicknesses. This method is now being used for the production of cylindrical molded products or shafts for sporting goods or primary or secondary structural materials for aircrafts, or for the production of various materials. The reinforcing material having a resin impregnated and serving as a matrix, is called prepreg and may be in the form of strands, sheets stretched in one direction or fabrics. To obtain a molded product having a desired shape, it is known to use a filament winding method which comprises winding prepreg strands, or a lay-up method which comprises laminating prepreg sheets.

To laminate prepreg sheets, it is important that the prepreg has a proper adhesiveness (tackiness) so that prepreg sheets adhere to one another at the time of laying up, and a flexibility (draping properties) so that laid up prepreg layers accurately reflect the shape such as a curved surface or cylinder. Under these circumstances, epoxy resin compositions having suitable tackiness and draping properties were proposed in Japanese Examined Patent Publications No. 5925/1983, No. 17535/1983 and No. 40975/1983 and Japanese Unexamined Patent Publications No. 43615/1986 and No. 127317/1987.

However, such conventional resin compositions had drawbacks that depending upon the shape or various properties such as mechanical and physical properties of the reinforcing material to be used, the operation efficiency depending upon the tackiness and draping properties substantially decreases, and consequently the operation tends to be cumbersome, or it is difficult to obtain a molded product having satisfactory properties.

Namely, such an operation prior to the molding depends heavily on the tackiness of the resin composition constituting the prepreg and on the draping properties of the prepreg inclusive of the reinforcing material. The draping properties of the prepreg varies not only by the influence of the resin composition but also by the characteristics of the reinforcing material. To minimize such an influence by the characteristics of the reinforcing material, it is considered to be advisable to employ a resin composition which enriches the draping properties of the prepreg.

Under such circumstances, the present inventors have previously found that by a combination of resins having specific physical properties, it is possible to obtain a prepreg having excellent draping properties (Japanese Unexamined Patent Publication No. 308026/1988), and further found a resin composition for improving the strength in the direction of 90° C. when a on directional prepreg is prepared (Japanese Patent Application No. 40517/1988). They have further found that by blending a phenol novolak type epoxy resin to such as resin composition, a molded product having no internal voids after the thermosetting molding can be obtained while adequately maintaining the shape-maintaining strength of the prepreg sheets and excellent draping properties (Japanese Patent Application No. 170228/1988).

Such a resin composition does not create any particular problem when applied to fiber reinforced plastic materials wherein reinforcing fibers of usual physical properties are employed. However, in a case where the reinforcing fibers have a high modulus of elasticity, the tackiness tends to be slightly poor, and it frequently happens that the shape after the shape-forming can not be maintained.

Further, the fluidity at the time of thermosetting is substantial, and it may happen that when the curing speed is slow, the shape prescribed prior to the heating will be deformed, or a substantial amount of the resin component will flow out. As a result, the molded product tends to have void spaces or portions where the resin is inadequate, and it tends to be difficult to obtain a flawless molded product having high reliability.

Namely, the thermosetting resin containing a reinforcing material is required to have a proper fluidity as well as a proper curing speed for thermosetting.

Under these circumstances, the present inventors have conducted extensive researches and as a result, have found that by incorporating a phenol novolak type epoxy resin further to the previously proposed resin composition, it is possible to attain proper fluidity and proper curing speed while adequately maintaining the excellent draping properties and the shape-maintaining strength of the prepreg sheets, whereby it is possible to maintain the shape of the molded product after shaping and to obtain a molded product free from internal voids after thermosetting. The present invention has been accomplished on the basis of this discovery.

Namely, it is an object of the present invention to provide a resin composition for fiber reinforced plastic which is excellent in the operation efficiency while maintaining excellent draping properties and the shape-maintaining strength of prepreg sheets and which is capable of presenting a molded product having no voids in the interior of the molded product after thermosetting molding.

Such an object can be accomplished by a resin composition for fiber reinforced plastic comprising the following components A, B, C, D and E as essential components:

A: a bisphenol A type epoxy resin having an epoxy equivalent of at most 250 and being liquid at room temperature, B: a bisphenol A type epoxy resin having an epoxy equivalent within a range of from 400 to 5,000 and softening point of from 60° to 200° C., C: a phenol novolak type epoxy resin, D: a nitrile rubber, and E: a curing agent.

Now, the present invention will be described in detail.

With respect to the bisphenol A type epoxy compound (component A) having an epoxy equivalent of at most 250 and being liquid at room temperature to be used in the present invention, there is no particular restriction so long as it has an epoxy equivalent of at most 250, preferably from 180 to 200 and it is liquid at room temperature. Specifically, the following compounds may be mentioned:

"EPIKOTE" 816, 827, 828, manufactured by Yuka Shell Epoxy Company,

"Araldite" GY250, GY260, manufactured by Ciba Geigy Company,

"AER" 334, 330, 331, manufactured by Asahi Chemical Industry Co., Ltd.,

"Sumiepoxy" ELA-115, ELA-127, ELA-128, manufactured by Sumitomo Chemical Co., Ltd., "EPICLON" 855, 840, 850, manufactured by Dai Nippon Ink Kagaku K.K., "EPOTOHTO" YD-115, YD-127, YD-128, manufactured by TOHTO KASEI CO., LTD., "EPOMIK" R130, R139, R140, manufactured by Mitsui Petrochemical Industries, Ltd.

With respect to the bisphenol A type epoxy resin (component B) having an epoxy equivalent of from 400 to 5,000 and a softening point of from 60° to 200° C., any such resin may be used long as it has an epoxy equivalent of from 400 to 5,000, preferably from 400 to 3,500 and a softening point of from 60 to 200, preferably from 60 to 160. Specifically, the following materials may be mentioned:

"EPIKOTE" 1001, 1002, 1004, 1004, 1007, 1009, 1010, manufactured by Yuka Shell Epoxy Company, "Araldite" 6071, 7072, 6084, 6097, 6099, manufactured by Ciba Geigy Company, "AER" 661, 662, 664, 667, 669, manufactured by Asahi Chemical Industry Co., Ltd., "Sumiepoxy" ESA-011, ESA-014, ESA-017, ESA-019, manufactured by Sumitomo Chemical Co., Ltd., "EPICLON" 1050, 4050, 7050, manufactured by Dai Nippon Ink Kagaku K.K., "EPOTOHTO" YD-011, YD-012, YD-014, YD-017, YD-019, manufactured by TOHTO KASEI CO., LTD., "EPOMIK" R301, R302, R304, R307, R309, manufactured by Mitsui Petrochemical Industries, Ltd.

This component B is preferably a mixture comprising component B1 which is a bisphenol A type epoxy compound having an epoxy equivalent of at most 1,000 and a softening point of at most 100° C. and being solid at room temperature and component B2 which is a bisphenol A-epoxy compound having an epoxy equivalent of at least 110 and a softening point of at least 110° C. and being solid at room temperature. Specific examples will be given for components B1 and B2, respectively.

With respect to the bisphenol A type epoxy compound (component B1) having an epoxy equivalent of at most 1,000 and a softening point of at most 100° C. and being solid at room temperature, any such compound may be used so long as it has an epoxy equivalent of at most 1,000, preferably from 400 to 1,000, and a softening point of at most 100° C., preferably from 60° to 100° C. Specifically, the following compounds may be mentioned:

"EPIKOTE" 1001, 1002, 1004, manufactured by Yuka Shell Epoxy Company,

"D. E. R." 667, 668, 669, manufactured by Dow Chemical Company,

"Araldite" 6071, 7072, manufactured by ciba Geigy Company,

"Suminepoxy" ESA-011, ESA-014, manufactured by sumitomo chemical Co., Ltd.,

"EPICLON" 1050, 4050, manufactured by Dai Nippon Ink Kagaku K.K.,

"EPOTOHTO" YD-011, YD-127, YD-012, YD-014, manufactured by TOHTO KASEI CO., LTD., "EPOMID" R301, R302, R304, manufactured by Mitsui Petrochemical Industries, Ltd.

With respect to the bisphenol A type epoxy compound (component B2) having an epoxy equivalent of at least 1,100 and a softening point of at least 110° C. and being solid at room temperature, any such compound may be used so long as it has an epoxy equivalent of at least 1,100, preferably from 1,100 to 5,000, more preferably from 1,100 to 3,500, and a softening point of at lest 110° C., preferably from 110° to 200° C., more preferably from 110° to 160° C. Specifically, the following compounds may be mentioned:

"EPIDOTE" 1007, 1009, 1010, manufactured by Yuka Shell Epoxy company,

"D. E. R." 6678, 668, 669, manufactured by Dow Chemical Company,

"Araldite" 6097, 6099, manufactured by Ciba Geigy Company,

"Sumiepoxy" ESA-017, ESA-019, manufactured by Sumitomo Chemical Co., Ltd.,

"EPICLON" 7075, 7055, 9050, manufactured by Dai Nippon Ink Kagaku K.K.,

"EPOTOHTO" YD-017, YD-119, manufactured by TOHTO KASEI CO., LTD.,

"EPOMIK" R307, R309, manufactured by Mitsui Petrochemical Industries, Ltd.

The phenol novolak type epoxy compound (component C) means a compound of the formula:

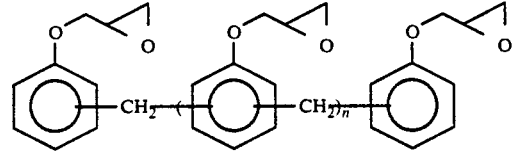

wherein n is an integer.

As such a phenol novolak type epoxy resin (component C), the following compounds may specifically be mentioned:

"EPIKOTE" 152, 154, manufactured by Yuka Shell Epoxy Company,

"Araldite" EPN1138, EPN1139, manufactured by Ciba Geigy Company,

"D.E.N" 431, 438, 439, 485, manufactured by Dow Chemical Company,

"EPPN" 201, manufactured by Nippon Kayaku K.K.,

"EPICLON" N-730, N-738, N-740, manufactured by Dai Nippon Ink Kagaku K.K.

These compounds may be used alone or in combination as a mixture of two or more different types.

The nitrile rubber of component D is not particularly restricted, and it is usual to employ the one having an average molecular weight of at least 10,000. Specifically, a copolymer of butadiene and acrylonitrile may be employed. Further, it may be a copolymer having acrylic acid added to butadiene and acrylonitrile. It is usual to employ such copolymer having an average molecular weight of about 50,000. The acrylonitrile content is usually from 15 to 40% by weight.

The nitrile rubber of component D may be incorporated independently in the form of nitrile rubber to the epoxy resin composition of the present invention. However, it is preferred to preliminarily mixing and reacting it with the epoxy compound of component A so that it may be incorporated in the form of a nitrile rubber-modified epoxy compound thus obtained.

In the present invention, the above mentioned respective components are essential components, and their proportions are preferably such that relative to 100 parts by weight of component A, component B is from 5 to 40 parts by weight, component C is from 50 to 140 parts by weight and component D is from 1 to 8 parts by weight. More Preferably their proportions are such that relative to 100 parts by weight of component A, component B1 is from 5 to 40 parts by weight, component B2 is from 5 to 40 parts by weight, component C is from 50 to 140 parts by weight and component D is from 1 to 8 parts by weight. Further, it is important that the resin composition of the present invention has a viscosity at 40° C. ($\eta 40°$ C.) of at least 10,000 poise, preferably from 10,000 to 40,000 poise, more preferably from 10,000 to 30,000 poise and a viscosity at 80° C. ($\eta 80°$ C.) of at most 200 poise, preferably from 20 to 200 poise, more preferably from 50 to 150 poise.

If the viscosity ($\eta 40°$ C.) is less than 10,000 poise, the surface tends to be sticky although the operation efficiency may be improved. On the other hand, if it is too high, the operation efficiency tends to be poor, since the hardness tends to be too high.

If the viscosity ($\eta 80°$ C.) exceeds 200 poise, the moldability in heat molding tends to be poor. On the other hand, if the viscosity is too low, the flowability tends to be so excellent that the operation efficiency tends to be poor, such being undesirable.

Here, in the present invention, component A and component B primarily serve to adjust the viscosity of the resin composition. Particularly, in the present invention, the adhesive properties of the resin composition can be improved by the combined use of components B1 and B2. Component D serves primarily to impart excellent operation efficiency and is effective particularly for the improvement of the flexibility of the resin composition.

Component C serves to prevent formation of voids in the interior of the molded product. If components C and D are not incorporated, it tends to be difficult to impart good flexibility with a proper viscosity during the preparation of prepreg sheets or during the molding operation, and voids tend to form in the interior of the molded product, such being very inconvenient.

As far as the physical properties of the resin mixture can be maintained, other components such as an aliphatic epoxy resin, an o-cresol novolak type epoxy resin, a polyglycidyl amine, a bisphenol F type epoxy resin, a brominated bisphenol A type epoxy resin, 1,1,2,2-tetrabis(4-glycidoxyphenyl)ethane, a glycidyl ester type epoxy resin and a monofunctional epoxy compound, may further be incorporated, as the case requires.

The curing agent of component E may usually be any curing agent. It may be dicyandiamide, an acid anhydride, an aromatic diamine, dimercaptan or a phenol resin. Further, in order to impart storage stability and low temperature curability to the prepreg, it is effective to employ a combination of dicyandiamide and a curing accelerator. Even when dicyandiamide is used alone, no change is required in the operation prior to the molding, provided that the molding compositions such as the curing temperature may vary. The curing accelerator may be an imidazole derivative such as 2-ethyl-4-methylimidazole or 2-(2-cyanoethyl)-imidazole, or a urea derivative such as N-(3,4-dichlorophenyl)-N',N'-dimethylurea, N-(4-chlorophenyl)-N',N'-dimethylurea or N-(3-chlorophenyl)-N',N'-dimethylurea. In such a combination of curing agents i.e. a combination of dicyandiamide and a curing accelerator, it is preferred that dicyandiamide is incorporated in an amount of form 0.5 to 10 parts by weight, based on 100 parts by weight of the entire resin mixture, and the curing accelerator is incorporated in an amount of from 0.5 to 10 parts by weight.

The resin composition of the present invention is useful for fiber reinforced plastics. The reinforcing fibers may be glass fibers, carbon fibers, aramide fibers, alumina fibers or boron fibers. It is particularly preferred to employ carbon fibers having a high modulus of elasticity. Such fiber reinforced plastics may be prepared by usual methods such as a solution method or a heat melting method.

Now, the present invention will be described in further detail with reference to Examples. However, it should be understood that the present invention is by no means restricted to such specific Examples.

Dicyandiamide was used in an amount of 0.34 time of the stoichiometric amount based on active hydrogen of the epoxy functional groups of all the epoxy resins contained in the composition, and N-(3,4-dichlorophenyl)-N',N'-dimethyl urea was used in an amount of 3.8 parts by weight relative to 100 parts by weight of components A, B, C and D of the composition. Further, the viscosity used in the present invention was the one measured by "Dynamic Mechanical Spectrum Meter" manufactured by Leometorix Company.

EXAMPLE 1

To 46 parts by weight of a nitrile rubber-modified epoxy resin obtained by preliminarily mixing and reacting 5 parts by weight of nitrile rubber ("Hycar 1472" manufactured by BFG, acrylonitrile content: 27%) and 95 parts by weight of a bisphenol A-type epoxy resin having an epoxy equivalent of from 184 to 194 and being liquid at room temperature ("EPIKOTE 828", manufactured by Yuka Shell Epoxy Company), 8 parts by weight of the above liquid bisphenol A type epoxy resin, 6 parts by weight of a bisphenol A type epoxy resin having an epoxy equivalent of from 2,400 to 3,300 and being solid at room temperature ("EPIKOTE 1009", manufactured by Yuka Shell Epoxy Company), 40 parts by weight of a phenol novolak type epoxy resin ("D.E.N 485", manufactured by Dow Chemical Company) and 4 parts by weight an alicyclic epoxy resin ("Araldite CY1709", manufactured by Ciba Geigy Company), 3.5 parts by weight of dicyandiamide as a curing agent ("DICY7", manufactured by Yuka Shell Epoxy Company) and 3.8 parts by weight of N-(3,4-dichlorophenyl)-N',N'-dimethyl urea as a curing accelerator ("DCMU99", manufactured by Hodogaya Chemical Co., Ltd.) were added to obtain a resin composition. The viscosity at 40° C. of this resin composition was 6,000 poise. Further, the time required for the melt viscosity to rise from 10 poise to 1,000 poise when cured under heating at a constant rate of 3° C./min was 110 seconds.

A one-directional prepreg obtained by impregnating this resin composition to carbon fibers, was laminated by winding it on a tapered mandrel, whereby lamination reflecting the shape of the curved surface of the mandrel was possible, and the operation efficiency was excellent. Further, no voids were observed in the interior of the molded product after curing. The results are shown in Table 1.

EXAMPLE 2

To 40 parts by weight of the nitrile rubber-modified epoxy resin used in Example 1, 8 parts by weight of the above mentioned liquid bisphenol A type epoxy resin, 12 parts by weight of a bisphenol A type epoxy resin having an epoxy equivalent of from 430 to 500 and being solid at room temperature ("EPIKOTE 1001", manufactured by Yuka Shell Epoxy Company), 40 parts by weight of a phenol novolak type epoxy resin ("D.E.N485", manufactured by Dow Chemical Company) and 4 parts by weight of an alicyclic epoxy resin ("Araldite CY179", manufactured by Ciba Geigy Company), 3.5 parts by weight of dicyandiamide as a curing agent ("DICY7", manufactured by Yuka Shell Epoxy company) and 3.8 parts by weight of N-(3,4-dichlorophenyl)-N,N'-dimethyl urea ("DCMU99", manufactured by Hodogaya Chemical Co., Ltd.) as a curing accelerator, were added to obtain a resin composition. The viscosity at 40° C. of this resin composition was 800 poise. Further, the time required for the melt viscosity to rise from 10 poise to 1,000 when cured under heating at a constant rate of 3° C./min, as 100 seconds.

A one-directional prepreg obtained by impregnating this resin composition to carbon fibers, was laminated by winding it on a tapered mandrel, whereby lamination reflecting the shape of the curved surface of the mandrel was possible, and the operation efficiency was excellent. Further, no voids wee observed in the interior of the molded product after curing. The results are shown in Table 1.

COMPARATIVE EXAMPLE 1

To 80 parts by weight of the nitrile rubber-modified epoxy resin used in Example 1 and 20 parts by weigh of a bisphenol A type epoxy resin having an epoxy equivalent of from 2,400 to 3,300 and being solid at room temperature ("EPIKOTE 1009", manufactured by Yuka Shell Epoxy Company), 3.0 parts of dicyandiandiamide as a curing agent ("DICY7", manufactured by Yuka Shell Epoxy company) and 3.8 parts by weight of N-(3,4-dichlorophenyl)-N',N'-dimethyl urea as a curing accelerator ("DCMU99", manufactured by Hodogaya Chemical Co., Ltd.), were added to obtain a resin composition. The viscosity at 40° C. of this resin composition was 6,000 poise. Further, the time for the melt viscosity to rise from 10 poise to 1,000 poise when cured under heating at a constant rate of 3° C./min was 350 seconds.

A one-directional prepreg obtained by impregnating this resin composition to carbon fibers, was laminated by winding it on a tapered mandrel, whereby lamination reflecting the shape of the curved surface of the mandrel very well was possible, and the operation efficiency was very good. However, since the increase of the melt viscosity during the thermosetting was slow, voids tended to form in the interior of the molded product having high reliability and being free from defects. The results are shown in Table 1.

COMPARATIVE EXAMPLE 2

To 76 parts by weight of a bisphenol A type epoxy resin having an epoxy equivalent of from 184 to 194 and being liquid at room temperature ("EPIKOTE 828", manufactured by Yuka Shell Epoxy Company) and 24 parts by weight of a bisphenol A type epoxy resin having an epoxy equivalent of 2,400 to 3,300 and being solid at room temperature ("EPIKOTE 1009", manufactured by Yuka Shell Epoxy Company), 3.0 parts by weight of dicyandiamide as a curing agent ("DICY7", manufactured by Yuka Shell Epoxy Company) and 3.8 parts by weight of N-(3,4-dichlorophenyl)-N',N'-dimethyl urea as a curing accelerator ("DCMU99", manufactured by Hodogaya Chemical Co., Ltd.), were added to obtain a resin composition. The viscosity at 40° C. of this resin composition was 6,000 poise. It was attempted to laminate a one-directional prepreg obtained by this resin composition by winding it in the same manner as in example 1, whereby the prepreg had inadequate draping properties and was poor in reflecting the shape of the curved surface of the mandrel, and the operation efficiency was poor. The results are shown in Table 1.

COMPARATIVE EXAMPLE 3

To 40 parts by weight of a bisphenol A type epoxy resin having an epoxy equivalent of from 184 to 194 and being liquid at room temperature ("EPIKOTE 828", manufactured by Yuka Shell Epoxy Company), 50 parts by weight of a bisphenol A type epoxy resin having an epoxy equivalent of for 400 to 500 and being solid at room temperature ("EPIKOTE 1001", manufactured by Yuka Shell Epoxy Company) and 10 parts by weight of a phenol novolak type epoxy resin ("EPIKOTE 154", manufactured by Yuka Shell Epoxy Company), 2.7 parts by weight of dicyandiamide as a curing agent ("DICY7", manufactured by Yuka Shell Epoxy Company) and 3.8 parts by weight of N-(3,4-dichlorophenyl)-N',N'-dimethyl urea as a curing accelerator ("DCMU99", manufactured by Hodogaya Chemical co., Ltde.), were added to obtain a resin composition. The viscosity at 40° C. of this resin composition was 11,000 poise.

It was attempted to conduct winding and lamination in the same manner as in Example 1 by using a cone-directional prepreg obtained by using this resin composition. During such operations, the prepreg sheets tended to be raptured in a direction of 90° C. to the orientation the fibers, and the operation efficiency was poor. The results are shown in Table 1.

TABLE 1

| | Resin Composition | | | | | | | | |
|---|---|---|---|---|---|---|---|---|---|
| | Nitrile rubber-modified epoxy resin[*1] | "EPIKOTE" 828[*2] | "EPIKOTE" 1001[*3] | "EPIKOTE" 1009[*4] | "D.E.N" 485[*5] | EPIKOTE 154[*6] | "Araldite" CY179[*7] | Dicyandi-amide | N-(3,4-dichloro-phenyl)-N',N'-dimethyl-urea |
| Example 1 | 46 | 8 | — | 6 | 40 | — | 4 | 3.5 | 3.8 |
| Example 2 | 40 | 8 | 12 | — | 40 | — | 4 | 3.5 | 3.8 |
| Comparative Example 1 | 80 | — | — | 20 | — | — | — | 3.0 | 3.8 |
| Comparative | — | 76 | — | 24 | — | — | — | 3.0 | 3.8 |

TABLE 1-continued

| Example 2 Comparative Example 3 | — | 40 | 50 | — | — | 10 | — | 2.7 | 3.8 |

| | | Characteristics | | | | |
|---|---|---|---|---|---|---|
| | | Viscosity at 40° C. (poise) | Time required for the viscosity rise (sec) | Lamination efficiency | Shape-maintaining strength of prepreg | Presence or absence of voids in the molded product |
| | Example 1 | 6,000 | 110 | Good | Good | Absent |
| | Example 2 | 8,000 | 100 | Good | Good | Absent |
| | Comparative Example 1 | 6,000 | 350 | Good | Good | Present |
| | Comparative Example 2 | 6,000 | — | Poor | — | — |
| | Comparative Example 3 | — | — | Poor | Inadequate | — |

*[1] Prepared by preriminaliry mixing and reacting 5 parts by weight of nitrile rubber (Hycer 1472) and 95 parts by weight of a liquid bisphenol A type epoxy resin (EPIKOTE 828).
*[2] A liquid bisphenol A type epoxy resin
*[3] A bisphenol A type epoxy resin having a softening point of from 60 to 75° C.
*[4] A bisphenol A type epoxy resin having a softening point of from 135 to 160° C.
*[5] A phenol novolak type epoxy resin
*[6] A phenol novolak type epoxy resin
*[7] An alicyclic epoxy resin

EXAMPLE 3

33 pars by weight of a nitrile rubber-modified epoxy resin (component D) obtained by preliminarily mixing and reaction 5 parts by weight of nitrile rubber (acrylonitrile content: 27%) and 95 parts by weight of a bisphenol A type epoxy compound having an epoxy equivalent of 190 and being liquid at room temperature, 8 parts by weight of the above liquid epoxy compound (component A), 7 parts by weigh of a solid epoxy compound having an epoxy equivalent of 460 and a melting point of 68° C. (component B1), 5 pats by weight of a solid epoxy compound having an epoxy equivalent of 3,000 and a melting point of 148° C. (component B2), 36 pats by weight of a phenol novolak type epoxy compound (component C), 4 parts by weight of an alicyclic epoxy compound (epoxy equivalent: 140, liquid at room temperature), 4 parts by weight of dicyandiamide as a curing agent (component E) and 3 parts by weight of N-(3,4-dichlorophenyl)-N',N'-dimethylurea as a curing accelerator, were uniformly mixed under heating to obtain a resin composition of the present invention. The viscosity of this composition was 20,000 poise at 40° C. and 120 poise at 80° C.

A one-directional prepreg obtained from this resin composition and highly elastic carbon fibers having a modulus of elasticity of 65,000 kg/mm², was wound on a slightly tapered cylindrical mandrel having a diameter of 10 mm at an angle of 45°, whereby lamination reflecting the shape of the mandrel was possible, and the operation efficiency was excellent. Further, no defects such as voids were observed in the folded products after curing.

COMPARATIVE EXAMPLE 4

In the same mandrel s in Example 3, a resin composition was prepared by uniformly mixing 46 parts by weight of component D, 8 parts by weight of component A, 6 parts by weight of component B2, 40 parts by weight of component C, 4parts by weight of the alicyclic epoxy compound, 3.5 parts by weight of dicyandiamide and 3.8 parts by weight of the curing accelerator. The viscosity at 40° C. o this resin composition was 6,000 poise. A one-directional prepreg prepared by suing this resin composition was wound on the mandrel as in Example 3, whereby the end portion of the winding was partially peeled.

COMPARATIVE EXAMPLE 5

In the same manner as in Example 3, a resin composition was prepared by uniformly mixing 40 parts by weight of component D, 8 parts by weight of component A, 12 parts by weight of component B1, 40 parts by weight of component C, 4 parts by weight of the alicyclic epoxy compound, 3.5 parts by weight of component D and 3.8 parts by weight of the curing accelerator. The viscosity at 40° C. of this resin composition was 8,000 poise. A one-directional prepreg prepared by using this resin composition as wound on the mandrel in the same manner as Example 3, whereby the end portion of the winding was partially peeled as in the case of Comparative Example 4.

COMPARATIVE EXAMPLE 6

In the same manner as in Example 3, a resin composition was prepared by uniformly mixing 27 parts by weight of component D, 8 parts by weight of component A, 25 parts by weight of component B1, 40 parts by weight of component C, 4 parts by weight of the alicyclic epoxy compound, 3.5 parts by weight of component E and 3.8 parts by weight of the curing accelerator. The viscosity of this resin composition was 22,000 poise at 40° C. and 100 poise at 80° C. A one-directional prepreg prepared by using this resin composition was wound on the mandrel in the same manner as in Example 3 and cured, whereby the prepreg lacked in flexibility and was poor to follow the shape of the mandrel. After the curing, the cross section was inspected, whereby breakage of fibers was observed.

TABLE 2

| | Example 3 | Comparative Example 4 | Comparative Example 5 | Comparative Example 6 |
|---|---|---|---|---|
| Component D (nitrile rubber-modified epoxy | 33 | 46 | 40 | 27 |

TABLE 2-continued

|  | Example 3 | Comparative Example 4 | Comparative Example 5 | Comparative Example 6 |
| --- | --- | --- | --- | --- |
| resin) | | | | |
| Component A | 8 | 8 | 8 | 8 |
| Component B1 | 7 | — | 12 | 25 |
| Component B2 | 5 | 6 | — | — |
| Component C | 36 | 40 | 40 | 40 |
| Alicyclic epoxy compound | 4 | 4 | 4 | 4 |
| Component E (dicyandiamide) | 4 | 3.5 | 3.5 | 3.5 |
| Curing accelerator | 3 | 3.8 | 3.8 | 3.8 |
| Viscosity at 40° C. (poise) | 20,000 | 6,000 | 8,000 | 22,000 |
| Viscosity at 80° C. (poise) | 120 | — | — | 100 |
| Lamination efficiency*1 | ◯ | ◯ | ◯ | X |
| Shape-maintaining after shaping*2 | ◯ | X | X | X |
| Quality of cured product*3 | ◯ | ◯ | ◯ | X |

*1 Operation efficiency for winding on the mandrel: ◯: Good, X: Bad
*2 Peeling at the end portion of the winding: ◯: Nil, x: Partial peeling
*3 Breakage of fibers or voids in the cured product: ◯: Nil, X: Present According to the present invention, it is possible to obtain a resin composition for fiber reinforced plastic which is excellent in the operation efficiency and which is capable of presenting a flawless molded product.

What is claimed is:

1. A resin composition for fiber reinforced plastic comprising the following component A, B, C, D and E as essential components:
   A: a bisphenol A epoxy resin having an epoxy equivalent of at most 250 and being liquid at room temperature,
   B: a bisphenol epoxy resin having an epoxy equivalent within a range of from 400 to 5,000 and softening point of from 60° C. to 200° C.,
   C: a phenol novolak epoxy resin,
   D: a nitrile rubber, and
   E: a curing agent,
   wherein relative to 100 parts by weight of component A, component B is from 5 to 40 parts by weight, component C is from 50 to 140 parts by weight, and component D is from 1 to 8 parts by weight, and wherein said component B comprises component B1 which is a bisphenol epoxy resin having an epoxy equivalent of at most 1,000 and a softening point of at most 100° C. and being solid at room temperature and component B2 which is a bisphenol A epoxy resin having an epoxy equivalent of at least 1,10 and softening point of at least 100° C. and being solid at room temperature.

2. The epoxy resin composition according to claim 1, wherein relative to 100 parts by weight of component A, component B1 is from 5 to 40 parts by weight, component B2 si from 5 to 40 parts by weight, component C is form 50 to 140 parts by weight, and component D is from 1 to 8 parts by weight.

3. The epoxy resin composition according to claim 1, wherein the epoxy equivalent of component A is from 180 to 200.

4. The epoxy resin composition according to claim 1, wherein the epoxy equivalent of component B1 is from 400 to 1,000.

5. The epoxy resin composition according to claim 4, wherein the softening point of component B1 is from 60° to 100° C.

6. The epoxy resin composition according to claim 1, wherein the epoxy equivalent of component B2 is from 1,100 to 5,000.

7. The epoxy resin composition according to claim 1, wherein the epoxy equivalent of component B2 is from 1,100 to 3,500.

8. The epoxy resin composition according to claim 1, wherein the softening softening point of component B2 is from 110° to 200° C.

* * * * *